June 22, 1965 R. C. PEABODY 3,189,931
POWER SWEEPER IMPROVEMENTS
Filed Sept. 13, 1961 5 Sheets-Sheet 1
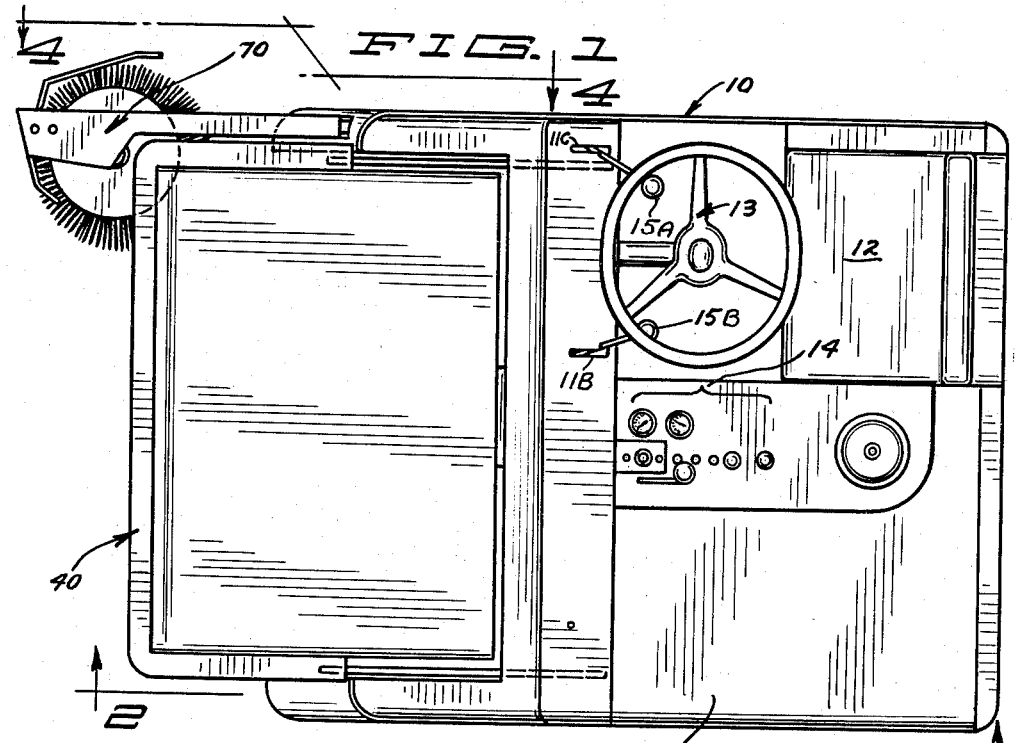
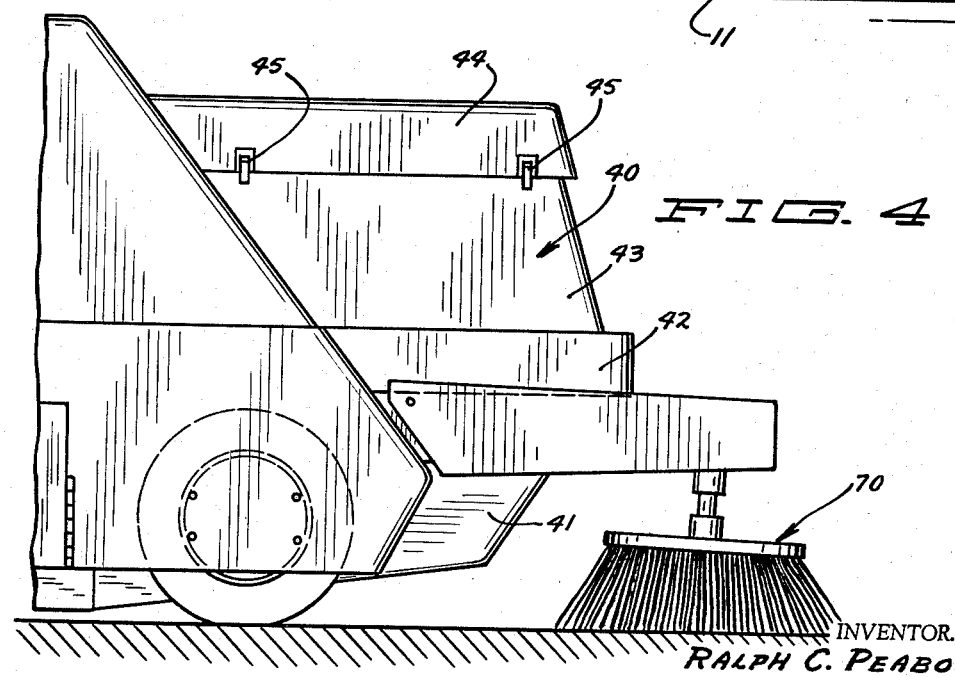
INVENTOR.
RALPH C. PEABODY
BY
Dugger & Johnson
ATTORNEYS

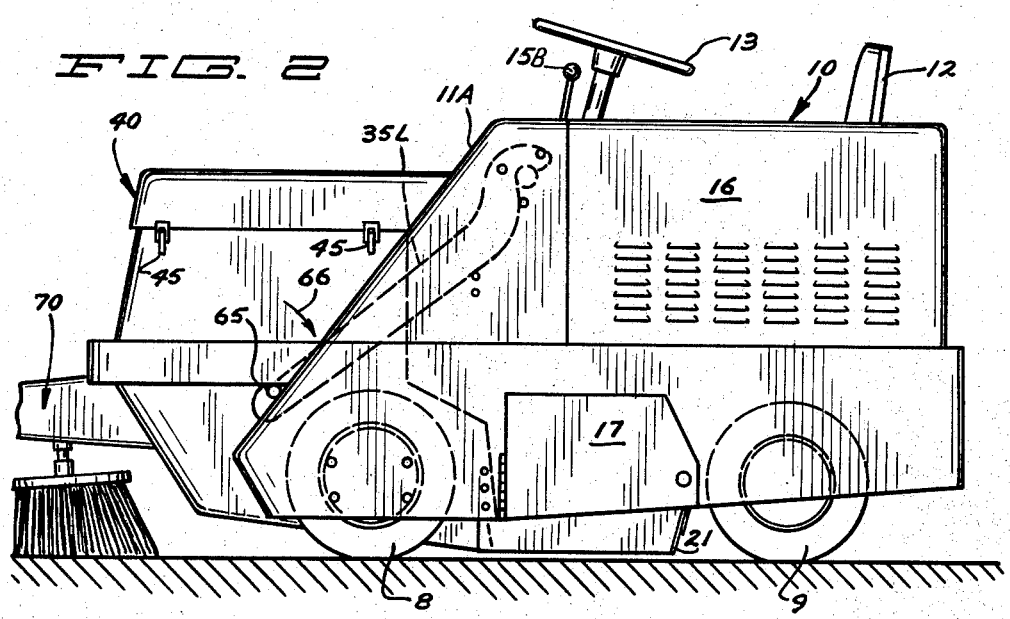
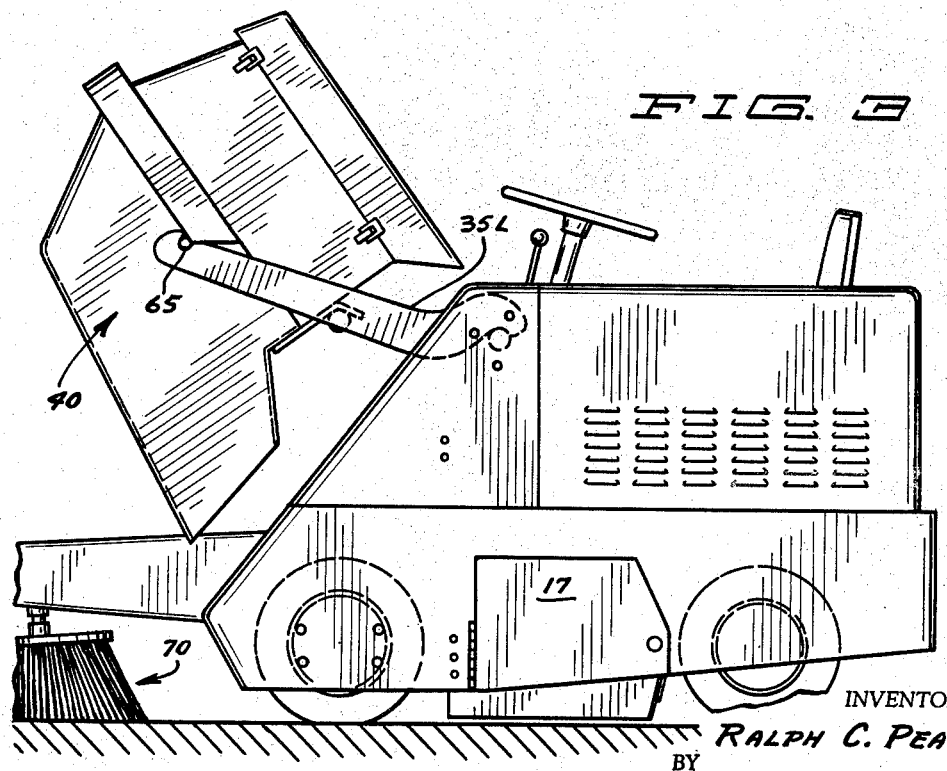

June 22, 1965   R. C. PEABODY   3,189,931
POWER SWEEPER IMPROVEMENTS
Filed Sept. 13, 1961   5 Sheets-Sheet 3
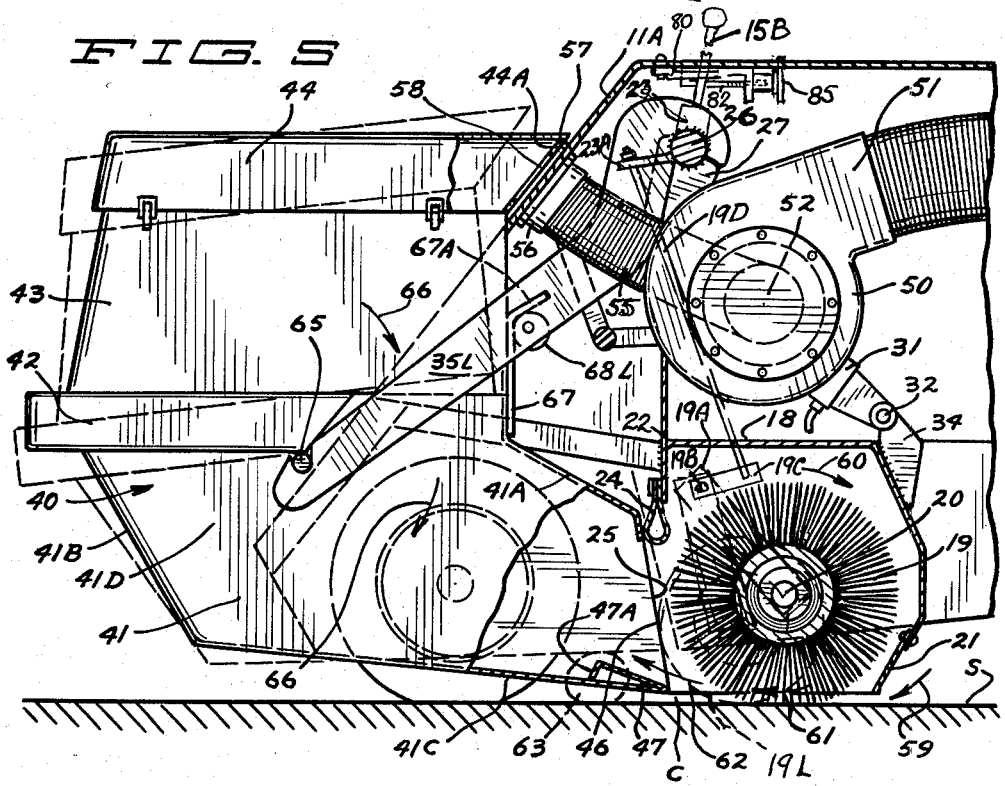
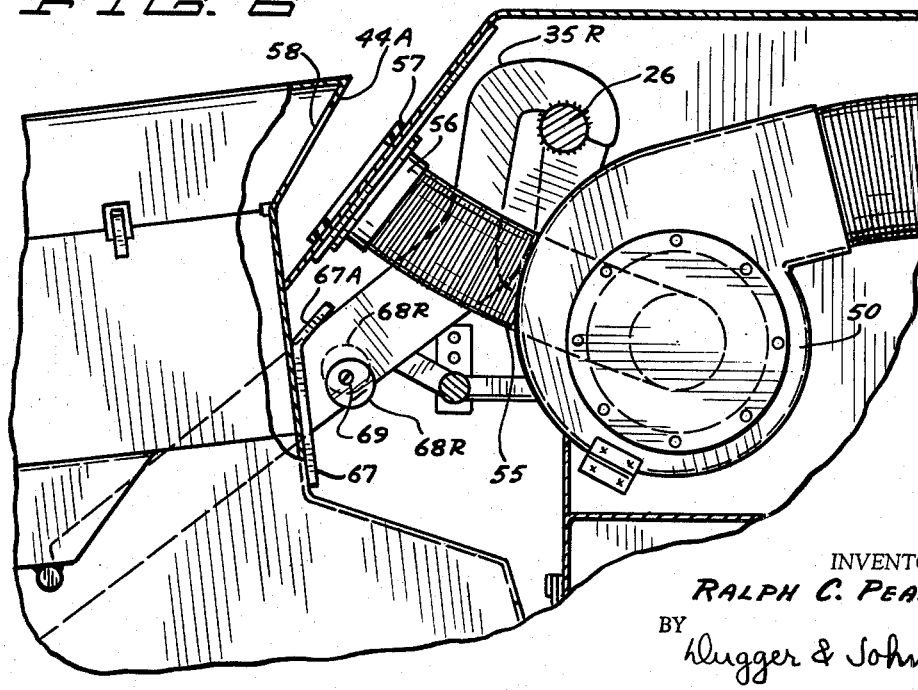
INVENTOR.
RALPH C. PEABODY
BY
Dugger & Johnson
ATTORNEYS

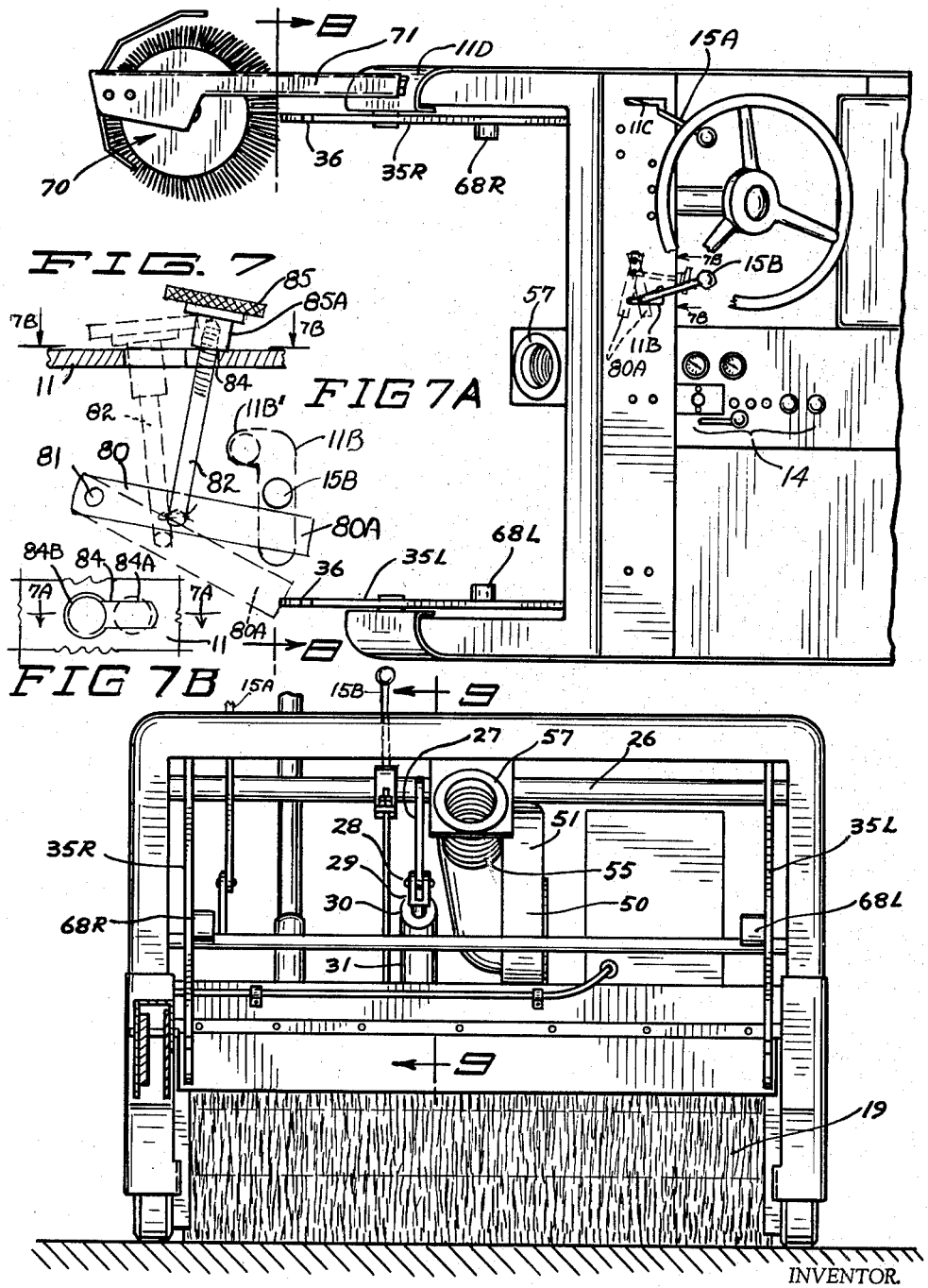

June 22, 1965  R. C. PEABODY  3,189,931
POWER SWEEPER IMPROVEMENTS
Filed Sept. 13, 1961  5 Sheets-Sheet 5
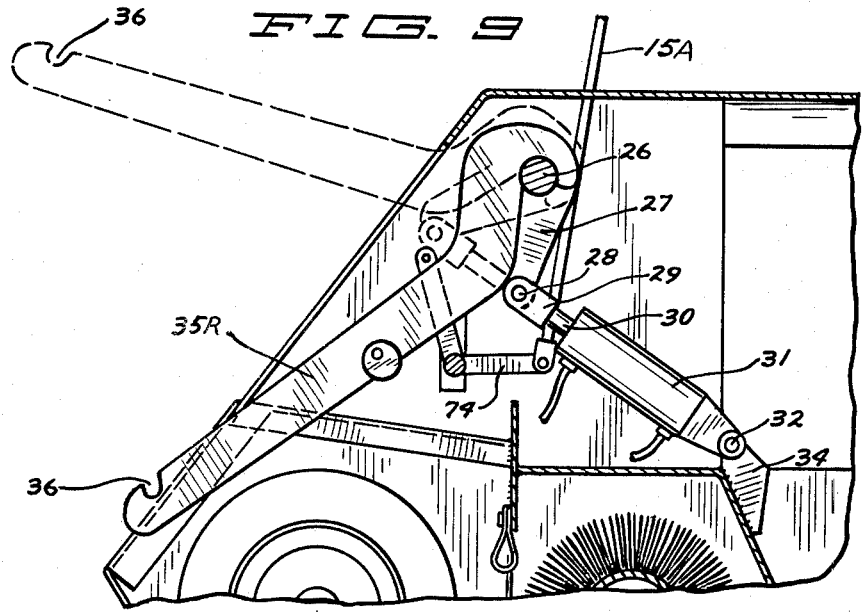
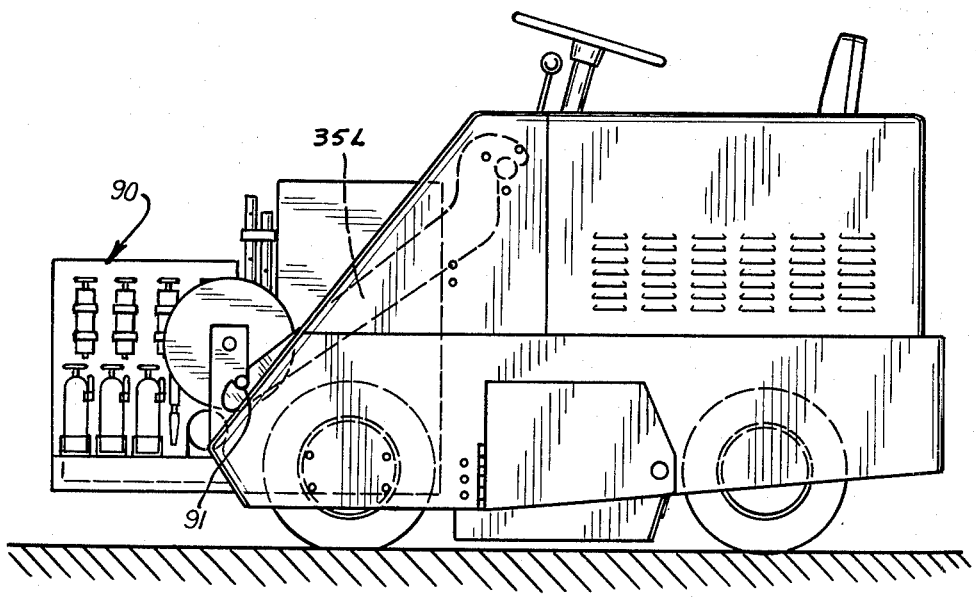
INVENTOR.
RALPH C. PEABODY
BY
Dugger & Johnson
ATTORNEYS United States Patent Office 3,189,931
Patented June 22, 1965

3,189,931
POWER SWEEPER IMPROVEMENTS
Ralph C. Peabody, Minneapolis, Minn., assignor to The
G. H. Tennant Company, Minneapolis, Minn., a corporation of Minnesota
Filed Sept. 13, 1961, Ser. No. 137,865
11 Claims. (Cl. 15—340)

This invention relates to power sweeper improvements, and particularly to mobile power sweepers of the dry type, having provision therein for controlling the dust which is raised by the sweeping action.

Power sweeping machines are mobile vehicles upon which are mounted brushes for sweeping the area over which the vehicle proceeds. The mobile vehicle utilizes driving and steering wheels, and is capable of a fair speed. Also frequently hydraulic equipment for manipulative controls etc., are available on the vehicle. A major part of the cost of the entire sweeping machine is required to provide the vehicle, its propulsive power controls, etc. It is an object of the present invention to provide a power sweeping device of the dry type which is capable of controlling the dust raised by the sweeping operation, and is also capable of being readily converted into a mobile vehicle of general utility, by removing certain of the components which are especially adapted for the sweeping operation. It is a further object of the invention to provide an improved power sweeping machine in which the debris and dust collection chamber can be readily attached and detached by a power means, and without extra help, for dumping, substituting additional equipment, or servicing.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 1 is a plan view of an exemplary power sweeping machine embodying the invention;

FIGURE 2 is a side elevational view of the left side of the vehicle, taken in the direction of arrows 2—2 of FIGURE 1;

FIGURE 3 is a left side elevational view of the sweeping machine shown in FIGURE 2, but showing the debris and dirt collecting hopper thereof moved to an elevated position, as for dumping or for detachment of the same;

FIGURE 4 is a fragmentary right side elevational view taken in the direction of arrows 4—4 of FIGURE 1;

FIGURE 5 is a fragmentary enlarged side elevational view of a portion of the device as shown in FIGURE 2, partly broken away and partly in section;

FIGURE 6 is a fragmentary enlarged side elevational view, partly broken away and partly in section, and corresponding to FIGURE 5, and in which the trash collection hopper is moved, as during encountering an obstruction on the surface being swept;

FIGURE 7 is a plan view corresponding to FIGURE 1, except that the debris collection hopper has been removed therefrom and the main brush adjusting mechanism is shown therein;

FIGURE 7A is a fragmentary horizontal sectional view illustrating the main brush height adjusting mechanism, and this view is taken on the line 7A—7A of FIGURE 7B;

FIGURE 7B is a fragmentary vertical view looking in the direction of arrows 7B—7B of FIGURES 7 and 7A;

FIGURE 8 is a front elevational view taken in the direction of arrows 8—8 of FIGURE 7;

FIGURE 9 is a fragmentary vertical sectional view taken along the line and in the direction of arrows 9—9 of FIGURE 8;

FIGURE 10 is a left side elevational view with the debris collection hopper removed therefrom and showing the vehicle transporting another work or load element.

Throughout the drawings, corresponding numerals refer to the same parts.

Referring to the drawings, the invention embodies a vehicle 10, which has support, propulsive, and steering wheels 8–9, a main vehicle body portion 11, operator seat 12, steering wheel 13 and various motor controls 14 and main brush height control 15B and curb brush height control 15A. The vehicle is provided with a motor compartment generally designated 16, see FIGURE 2, in which a power source, usually an internal combustion engine, is contained. The frame and housing of the vehicle is provided with a side door 17 which is hinged and may be opened so as to expose a sweeping compartment 18 of FIGURE 5, which extends transversely across the vehicle. The compartment is closed at the back and sides, but is open at the bottom so that the brush 19, which is journaled on axis 20, and driven by the power source on the vehicle, will be able to sweep the surface S over which the vehicle progresses. Brush 19 is supported on radius arms 19A that are pivoted to the machine frame at pivot 19B. Attached to the radius arms 19A is a lever 19C which is in turn attached to pull rod 19D. Rod 19D, which is adjustable via a nut at its upper end passes through an eye in crank lever 23A which is a part of bushing 23 that is journaled on cross shaft 26. A stout lever 15B with a ball-top passes up through an L-slot 11B in the frame so that when lever 15B is in the long part of the slot it will move forwardly (i.e. to the left in FIGURE 5, as shown by the arrow). This lowers rod 19D which in turn permits radius arms 19A to swing down and lower brush 19 until the resistance of the bristles prevent further movement. Normally the resistance of the bristles to sweeping action will cause the brush 19 (and arms 19A and associated linkages) to "float" and the lever 15B will thus "float" in the long part of slot 11B. When it is desired to lift brush 19 the lever 15B is pulled rearward (to the right in FIGURE 5) and is then pushed into the notch 11B' where it is retained. This lifts brush 19 out of contact with the surface S. As the bristles of brush 19 wear it will gradually lower a smaller diameter and its working position will lower, the radius arms 19A swinging down meanwhile to accommodate the lowering. It is a feature of this invention that the radius arms 19A being pivoted above and displaced from the brush axis in the sweeping direction will as a consequence cause the point of contact of the brush with surface S to move slightly forwardly (in the sweeping direction) as the brush diameter decreases and the brush axis lowers. As a consequence, the clearance dimension between the line of contact of the brush with the surface S and the sweeping lip 47 (over which the swept material is projected into pan 41) will gradually lessen as the brush diameter decreases with wear. This is an important advantage as it contributes to sweeping efficiency. The housing 18 is provided with a flexible skirt 21 at its back and sides. The front wall 22 of the housing is provided with an opening 25 from one sidewall to the other defined by a flexible nosing 24, the opening reaching to ground level.

A curb brush, generally designated 70, FIGURE 7, is supported on an arm 71 from a suitable pivot mounting in the front right portion 11D of the machine. This brush is arranged to be driven by mechanic or hydraulic power connection and can be raised and lowered by the control 15A which communicates through bell crank 74, as shown in FIGURE 9. The lever 15A moves in slot 11C.

Across the frame of the vehicle there is provided a strong shaft 26, which is journaled in the side plates of the vehicle frame. This shaft is arranged to be rotated by a crank 27, see FIGURES 5, 8 and 9, the crank being connected by pivot pin 28 to the clevis 29 on piston rod 30 in hydraulic cylinder 31, the base of the hydraulic cylinder being pivoted at 32 on frame piece 34, FIGURE 9. As a consequence of the operation of the hydraulic cylinder 31, the shaft 26 can be rotated in a clockwise or counter-clockwise direction as shown in FIGURE 9. On the shaft 26, are a pair of forwardly and downwardly extending arms 35L and 35R, which are stoutly connected to the shaft 26 so as to be swung up and down when the shaft 26 is rotated. The lower limit of rotation, and lower limit of the arms 35L and 35R is shown in dotted lines in FIGURE 2, and in full lines in FIGURES 5, 6 and 9. The upper limit of rotation of shaft 26, which swings the arms 35L and 35R clockwise, and hence upwardly, is shown in full lines in FIGURE 3, and in dotted lines in FIGURE 9. Each of the arms 35L and 35R is provided with a notch 36 at its outer end, for a purpose to be described.

The machine utilizes a debris collection hopper-filter entity which as a whole is generally designated 40. This entity includes a lower debris, dust and dirt retaining pan 41, a strong frame 42, a housing 43, which contains the filter, and a cover 44 which is held onto the filter housing 43 by means of manually detachable clips 45— 45, see FIGURES 2, 3 and 4. The details of construction of this entity 40 for collecting the dirt, dust and debris, and for filtering the air, are described in the copending application of Ralph C. Peabody and Keith N. Krier, Serial No. 137,864, filed September 13, 1961. For the present purposes, it is sufficient to say that the lower portion of the entity constitutes a pan 41, which is closed at all portions except for a rearwardly extending opening 46, see FIGURE 5, which extends into and against the soft rubber edging 24 which defines the opening 25 in the brush housing. The pan 41 has an upwardly sloping upper rearwall 41A and upwardly and forwardly sloping front wall 41B together with sidewalls 41D and bottom 41C. These are all formed as an integral unit, and the rear trailing edge of the bottom 41C, at the rear opening 46, is reinforced by a welded on channel-shaped sweeping lip 47, which also serves, by virtue of the portion 47A, to prevent dribbling out of accumulated debris, dirt and dust, when the machine is moved as to a dumping location.

At the convergence of the walls 41A, 41B, sidewalls 41D, and as defined by the reinforcing frame 42, there is an integrally attached housing 43 which contains a highcapacity dry type filter through which air entering the opening 46 into the pan 41 can pass and be filtered. The solids which are separated by the filter, fall or may be shaken down into the pan 41. The clean air emerging from the top of the filter, at the upper level of the housing 43, enters into a plenum chamber defined by the deep cover 44. This plenum chamber is closed all around except for the bottom portion which mates with and is gasket-sealed to the top of the filter housing 43, when the attaching buckles are pulled to "closed" position. The plenum chamber is provided at its rear portion with a downwardly and forwardly sloping rear wall 44A, which is parallel to the downwardly and forwardly sloping front wall 11A of the main vehicle body work, and has an opening 58 in it.

The main vehicle body is provided with a suction blower 50, which is connected by drive means not shown, to the power source contained within the housing 16. The suction blower has an outlet 51, which delivers to atmosphere, and a suction opening 52 which is connected by duct 55 to a nipple 56, at an opening in the front wall 11A of the vehicle body. This opening is provided all around with a soft rubber gasket 57, and the opening is located so that it will mate exactly with the openings 58 in the sloping wall 44A of the plenum chamber formed by cover 44. Accordingly, suction generated by the suction blower 50 is communicated to the nipple 56 and thence via port 58 to the plenum chamber 44, and hence to the clean or exhaust side of the filter contained within housing 43, and through the filter to the interior of the debris, dirt, and dust collection pan 41, which is otherwise closed, except for its rear opening 46. The rear portion of the pan 41, as previously stated, fits reasonably snug against the soft gasketing 24 around the opening 25 in the forward wall 22 of the brush chamber 18, and suction is accordingly communicated to the interior of the brush chamber. As a consequence, an inflow of air will occur, as shown by arrow 59 all around the under edge of the flexible skirt 21 which defines the lower edge of the wall of the brush chamber, and also to some extent under the lip of the pan 41.

The brush 19 rotates in the direction of arrow 60. Where the bristles engage the surface swept they travel in the direction of forward propulsion movement of the vehicle 10, this motion of the bristles being shown by arrow 61, FIGURE 5. The brush 19 as it rotates, and as the bristles strike the surface swept, has a "fan" action in addition to its sweeping action so that dust, debris, and dirt, as well as air are projected through the openings 25– 26 into the pan 41, as shown by arrow 62, and this flow of air through the openings is supplemented by the suction pulled in the pan 41, as previously described. The heavier particles of dirt and debris will fall into the bottom of the pan, whilst the dust, entrained in the air, is pulled upwardly through the filter contained in the housing 43 and the dust solids accordingly separated, the air meanwhile being drawn through the plenum chamber in cover 44 and through port 58 and into the port nipple 56 and thence into the blower 50. This system of operation continues uninterruptedly during sweeping.

The entire debris collection pan filter and plenum chamber 40 has a pair of stub pivots 65 extending at opposite sides thereof slightly below the frame 42, and these stub pivots are received into the notches 36 of the supporting arms 35R and 35L. The location of the axis of pivot 65 is such that whether filled or empty, the collection chamber and filter entity 40 will tend to rotate in a counterclockwise direction as shown by the arrow 66. At the rear of the collection entity 40 there are mounted brackets 67 which have upwardly and rearwardly extending portions 67A. One such bracket is provided at each side of the entity 40, closely adjacent the inner surfaces of the supporting arms 35R and 35L. On the insides of the supporting arms there are provided eccentrically adjustable stops 68R and 68L, which are best illustrated in FIGURE 6. The stops are made from a short length of rod which is provided with an eccentric holding bolt 69. When the bolt is loosened, the stop can be moved to any position, as for example, the dotted line position shown in FIGURE 6. As shown in FIGURE 5, the portions 67A of the bracket 67, on the back of the collecting entity 40, rest against the stops 68R and 68L, and by eccentrically rotating the stop, the stopping position of the entity or body 40 can be adjusted to thereby adjust the clearance under the trailing edge of the pan 41, during normal straight line operation on a level surface. However, when an obstruction is encountered such as a rock 63, FIGURE 5, which tends to lift the trailing edge 47 of the pin, the entire body 40 is perfectly free to rotate in a counterclockwise direction as shown in FIGURE 5, and thereby the brackets 67A will leave the stops 68R and 68L, and move to some such position as shown in dotted lines in FIGURE 5 and full lines in FIGURE 6, until the obstruction is cleared, after which the body 40 will again tend to fall, due to its unbalanced position, until the brackets 67A again encounter the stops. Whenever the debris, dirt and dust collector and filter entity 40 moves to the position shown in FIGURE 6, the seal which the surface 44A had maintained against the gasket 57 at the nipple 56 will be broken, and the suction theretofore pulled by the blower 50 into plenum chamber 44 and hence in the balance of the system including filter housing 43, pan 41, and brush housing 18, will be momentarily broken. It might at first be supposed that this would interfere with the capture of the dust-laden air raised by the brush 19, but in practice it is found that the breaking of the suction connection as shown in FIGURE 6, occurs quickly and that it is subsequently quickly restored, and as a result there is not lost any substantial degree of suction, or at least not enough to interfere with the capture and infiltration of the dust-laden air. In addition, the momentary relaxation of suction has a beneficial value since it aids in the self-cleaning of the filters used in the sweeper. When the suction has been interrupted in the manner just described, the entity 40 has usually moved abruptly. This abrupt movement shakes the filters as illustrated in said copending application of Peabody and Krier, and causes the accumulation of dirt on the filters to break away and fall down into the dust pan. The relaxation of the suction and the relaxation of the accompanying air movement permits the accumulation to fall more freely. Thus, the filter is cleaned automatically, and requires less manual cleaning.

Whenever it is desired to dump collected dirt and debris or service the entity 40, as for example, to clean it out, paint it, change the filters, or do any other work on it, the hydraulic cylinder 31 is operated by manipulation of the appropriate controls, and the arms 35R and 35L are raised to the full length position shown in FIGURES 3 and 9. After the dumping of the collected dirt, debris, and dust, a rack such as a wooden rack on castors, can be placed under the entity 40, and when the arms 35R and 35L are lowered, the entity 40 will be supported in an elevated position but on a separate rack, and in the approximate position shown in FIGURE 3. A lower rack may be used if desired. After the entity 40 is on the rack, the arms 35R and 35L are further lowered to the "down" position, and the machine 10 can then be backed away. The machine then assumes the condition shown in FIGURES 7 and 8.

When the machine has been removed from the collection entity 40, and is in the condition shown in FIGURES 7 and 8, it may then be used as a general transport vehicle, such as shown in FIGURE 10. A pallet or other object 90 desired to be transported is provided with support nubs 91, corresponding to those shown at 65 in FIGURE 5, except that the nubs may be variously shaped so as to prevent the object lifted from tipping. When the arms 35R and 35L are then elevated slightly, the element 90 may be lifted, and transported or raised or lowered as desired. The element 90 may be any working device, such as a snow shovel or snow blower, or may be simply a collection box for hand-swept dirt, etc. In some instances, portable fire-fighting equipment, having an indepentnt motor, and other such necessary equipment, may be conveniently placed at varying parts of the plant, so that a sweeping machine in the area can quickly uncouple the debris, dust and dirt collection hopper, and, as illustrated, pick up the fire-fighting equipment and carry it to the place of the fire. The basic vehicle 10, thus becomes an easily adaptable general transport vehicle for a wide variety of purposes.

In FIGURES 7, 7A and 7B there is illustrated a control whereby the lowermost position of brush 19 may be adjustably controlled, without loss of the "floating" action previously described, which may be used when needed. As shown in these figures, a lever 80 is pivoted at 81 in such a position that the free end 80A of the lever may be positioned to intersect the long part of L-slot 11B in which lever 15B moves and normally "floats." To lever 80 there is pivoted the end of a rod 82 which passes out through slot 84 in the part of the frame 11 which faces the driver, and on the projecting end of rod 82 there is screwed on a knob 85 having a thick shank 85A. Slot 84 has a narrow part 84A which has a width wide enough to pass rod 82 but narrow enough to hold shank 85A. Slot 84 has an enlarged end 84B which is big enough to pass shank 85A. The action is as follows. With the parts in the full line portion of FIGURE 7A, knob 85 is screwed down as much as needed to position end 80A of lever 80 at some desired position intersecting slot 11B, and the lever 80 then serves as a stop for lever 15B and hence holds brush 19 at a fixed lower elevation. The brush (and lever 15B) can "float" above this position. In some sweeping conditions the operator may want maximum "floating" action, as in passing over an undulating surface. To obtain maximum "floating" action, the operator merely moves knob 85 to the dotted position of FIGURE 7A, whereupon shank 85A passes through enlargement 84B in slot 84, and lever 80–80A moves to a position beyond the end of slot 11B.

As many widely apparently different embodiments of this invention may be made without departing from the spirit and scope thereof, it is to be understood that I do not limit myself to the specific embodiments herein.

What is claimed:

1. A sweeping machine comprising a mobile, powered steerable vehicle, a sweeping enclosure on said vehicle which extends substantially to the level of the surface over which the vehicle moves and is closed except for a bottom brush opening and an ejection opening through which swept material may be projected and air may flow, a suction device on the vehicle having a suction line extending to a suction port on the surface of the vehicle, movable support members on the vehicle for supporting a separate entity, a separate entity comprising a closed housing including a swept debris collection pan portion and a filter portion communicating with said pan portion, said pan portion having a filling opening leading into it and said filter portion having an exhaust opening leading out of it adjacent the top thereof, support parts on said entity to be engagable by the support members on the mobile vehicle for supporting and carrying the entity on the vehicle, the filling opening of the entity being located as to fit against and communicate with said ejection opening when the entity is carried by the support members, the support parts being located on said entity so that the entity tips freely to a position wherein the exhaust opening on the entity communicates with the said suction port when the entity is carried by said support members, and stop members mounted on said support members positioned to engage portions of said entity to limit the tipping action of said entity toward said suction port, said entity being free to move to a position wherein the exhaust opening does not fit against the said suction port.

2. The sweeping machine specified in claim 1 further characterized in that the positions of said stop members on said support members are adjustable.

3. A sweeping machine comprising a mobile, powered steerable vehicle, a sweeping enclosure on said vehicle which extends substantially to the level of the surface over which the vehicle moves and is closed except for a bottom brush opening and an ejection opening through which swept material may be projected and air may flow, a suction device on the vehicle having a suction line extending to a suction port on the surface of the vehicle, a pair of spaced apart support arms on the vehicle for supporting a separate entity, said arms being movable up and down, a separate entity comprising a closed housing including a swept debris collection pan portion and a filter portion communicating with said pan portion, said pan portion having a filling opening leading into it and said filter portion having an exhaust opening leading out of it adjacent the top thereof, support parts on said entity to be engagable by the support arms on the movable vehicle for pivotally supporting and carrying the entity on the vehicle, the entity being positioned between said arms, the filling opening of the entity being located as to fit against and communicate with said ejection opening when the entity is carried by the support arms, the support parts being located on said entity so that the entity normally tips freely to a position wherein the exhaust opening on the entity communicates with said suction port when the entity is carried by said support arms, said entity being free to pivot to a position wherein the exhaust opening does not fit against said suction port.

4. A sweeping machine comprising a mobile, powered steerable vehicle, a sweeping enclosure on said vehicle which extends substantially to the level of the surface over which the vehicle moves and is closed except for a bottom brush opening and an ejection opening through which swept material may be projected and air may flow, a suction device on the vehicle having a suction line extending to a suction port on the surface of the vehicle, movable support members on the vehicle for supporting a separate entity, a separate entity comprising a closed housing including a swept debris collection pan portion and a filter portion communicating with said pan portion, said pan portion having a filling opening leading into it and said filter portion having an exhaust opening leading out of it adjacent the top thereof, support parts on said entity to be engagable by the support members on the mobile vehicle for supporting and carrying the entity on the vehicle, the filling opening of the entity being located as to fit against and communicate with said ejection opening when the entity is carried by the support members, the support parts being located on said entity so that the entity normally tips freely to position wherein the exhaust opening on the entity communicates with the said suction port when the entity is carried by said support members, the adjacent surfaces of the entity and the vehicle being spaced a distance away from each other except where the surfaces mate at the ejection opening and suction port, and stop members on the entity and the support members for limiting movement of said entity toward said vehicle, said entity being free to move to a position wherein the exhaust opening does not fit against said suction port.

5. A sweeping machine comprising a mobile powered, steerable vehicle having an open bottom enclosure thereon, a power driven brush mounted for actuation in said enclosure, said enclosure including a forwardly directed ejection opening through which swept materials may be projected and air may flow, a suction device on the vehicle having a suction line extending to a forwardly facing suction port on a forward surface of the vehicle, support arms on the vehicle extending in laterally spaced relation from the front of the vehicle, power means on the vehicle for raising and lowering said arms, a separate entity having support parts thereon shaped and positioned to be engaged by the arms for supporting the entity between said arms and carrying it on the vehicle, said entity comprising a housing having a swept material collection pan portion at the bottom communicating directly with a filter portion which is above the pan and which discharges thereinto, said pan portion having a rearwardly directed filling opening leading into it, and said filter portion having a rearwardly directed exhaust opening disposed above and leading out of it, the filling opening of the pan portion and exhaust opening of the filter being positioned so that they connect with the ejection opening and suction port respectively when he entity is carried on the arms in a lowered position of said arms for sweeping action, the support parts on the entity being positioned so that when said entity is carried by said arms in lowered position it tends to tip in a direction to cause said exhaust opening to connect with said suction port, said entity being movable with the arms to an elevated disconnected position for discharging the pan portion.

6. A sweeping machine comprising a mobile powered steerable vehicle having an open bottom enclosure thereon, a power driven brush mounted for actuation in said enclosure, said enclosure including a forwardly directed ejection opening through which swept material may be projected and air may flow, a suction device on the vehicle having a suction line extending to a forwardly facing suction port on a forward surface of the vehicle, support arms on the vehicle extending in laterally spaced relation from the front of the vehicle, power means on the vehicle for raising and lowering said arms, a separate entity having trunnions thereon shaped and positioned to be engaged by the arms for supporting the entity between said arms and carrying it on the vehicle, said entity comprising a housing having a swept material collection pan portion at the bottom communicating directly with a filter portion which is above the pan and which discharges thereinto, said pan portion having a rearwardly directed filling opening leading into it, and said filter portion having a rearwardly directed exhaust opening disposed above and leading out of it, the filling opening of the pan portion and exhaust opening of the filter being positioned so that they connect with the ejection opening and suction port respectively when the entity is carried on the arms in a lowered position of said arms for sweeping action, the trunnions on said entity being positioned so that with said arms in lowered position said entity tends to tip in a direction to lower the filling opening thereof and to cause said exhaust opening to connect with said suction port, said entity being movable with the arms to an elevated disconnected position, and stop means on the arms for limiting such tipping movement of the entity.

7. The sweeping machine of claim 6 further characterized in that the bottom of the pan portion slopes downwardly and rearwardly with said arms in lowered position.

8. The sweeping machine of claim 7 further characterized in that said support parts on said entity and said stop members on said support members are positioned so that the portions of said entity defining said exhaust opening may freely pivot upwardly and forwardly when objects engage the rearward portion of the bottom of said entity as said vehicle travels forwardly during use.

9. The sweeping machine of claim 8 wherein the connection between said exhaust opening of the filter and said suction port is broken whenever said entity pivots upwardly and forwardly.

10. The sweeping machine of claim 9 wherein the suction on said filter portion is broken whenever said connection between said exhaust opening and said suction port is broken.

11. The sweeping machine of claim 5 and an annular resilient sealing ring positioned around said suction port, portions of said entity defining said exhaust opening being positioned to contact and seal on said sealing ring with said exhaust opening aligned with said suction point.

References Cited by the Examiner

UNITED STATES PATENTS

| | | | |
|---|---|---|---|
| 2,701,377 | 2/55 | Luksch et al. | 15—340 X |
| 2,739,340 | 3/56 | Blydenburgh et al. | 15—340 X |
| 2,784,440 | 3/57 | Newport | 15—340 |
| 2,829,391 | 4/58 | Swanson et al. | 15—340 X |
| 2,972,159 | 2/61 | Swanson et al. | 15—340 |
| 3,006,021 | 10/61 | Patch | 15—340 |

FOREIGN PATENTS

| | | |
|---|---|---|
| 421,348 | 12/10 | France. |
| 808,026 | 1/59 | Great Britain. |

WALTER A. SCHEEL, *Primary Examiner.*

CHARLES A. WILLMUTH, *Examiner.*